United States Patent [19]

Long

[11] Patent Number: 5,781,149
[45] Date of Patent: Jul. 14, 1998

[54] DOPPLER RADAR CLUTTER SPIKE REJECTOR

[76] Inventor: Maurice W. Long, 1036 Somerset Dr. NW., Atlanta, Ga. 30327

[21] Appl. No.: 855,278

[22] Filed: May 13, 1997

[51] Int. Cl.⁶ ............................................. G01S 13/534
[52] U.S. Cl. ............................... 342/160; 342/159
[58] Field of Search .............................. 342/159, 160, 342/161, 162, 90

[56] References Cited

U.S. PATENT DOCUMENTS

| | | | |
|---|---|---|---|
| 4,459,592 | 7/1984 | Long | 342/93 |
| 4,463,356 | 7/1984 | Short, III et al. | 342/160 |
| 4,684,950 | 8/1987 | Long | 342/94 |
| 5,485,157 | 1/1996 | Long | 342/160 |

*Primary Examiner*—Ian J. Lobo

[57] ABSTRACT

The invention is an improved clutter suppressor for MTI and pulse doppler radars operating so that the received clutter pulses are large enough to hard limit within the receiving system. It is especially useful for radars that use antenna beam scanning to perform tasks such as search, surveillance, and height finding because the combination of hard limiting with beam movement creates strong clutter residue at the output of a doppler filter. The invention can be implemented with either analog or digital technology, or with a digital processor and software.

16 Claims, 4 Drawing Sheets

DOPPLER RADAR CLUTTER SPIKE REJECTOR

BACKGROUND OF THE INVENTION

This invention relates to methods of and circuits for improving radar detection by rejecting radar output due to land and sea clutter. It is applicable to pulse doppler and MTI (moving target indication) radars, for which the principles are given in Chap. 4 of Introduction to Radar Systems, McGraw-Hill Book Company, 1980, by M. I. Skolnik. Within this document the term "doppler radar" refers to either MTI or pulse doppler radar.

Radar echo from land and sea surfaces causes unwanted radar signals called surface clutter. Surface clutter, being from stationary and slowly moving objects, has relatively small doppler frequencies that are at and near zero. Doppler radars are designed to detect radar echoes from moving targets having doppler frequencies appreciably above zero and to suppress signals having doppler frequencies at and near zero. For a stationary radar, the doppler frequency at the input of the doppler processor filter is at and near zero for surface clutter. This clutter is then suppressed by the doppler processor comprised of a MTI canceler, bandpass filters, or a combination thereof.

Antenna beam scanning across stationary objects with search radars, including those for air traffic control (ATC), is a source of non-zero doppler frequencies; and can cause strong spikes in the clutter residue (doppler processor output). This is especially true when the dynamic range of the receiving system prior to the doppler processor is inadequate to handle the large range of clutter amplitudes. Then, the combination of amplitude limiting and the beam scanning creates higher doppler frequencies of the signals at the input to a doppler processor. Therefore, when the amount of limiting is increased, the input to the doppler processor (be it a canceler or a bandpass filter) is subjected to a wider doppler spectrum; and therefore the clutter residue (doppler processor clutter output) is increased.

U.S. Pat. No. 4,463,356 (Short et al) teaches use of fixed amplitude thresholding for rejecting clutter spikes caused by amplitude limiting. The thresholding taught therein functions so that MTI canceler output will be rejected if the signal input to the MTI canceler is strong enough to be limited in amplitude. Otherwise, the MTI output resulting from a weaker, nonlimited MTI input signal is allowed to pass as radar output. As is discussed herein, when clutter limiting occurs for pulses received from the antenna beam center, the weaker nonlimited MTI input pulses received from directions near a minimum in the antenna pattern will generate strong MTI output (clutter residue). Therefore, the technique of Short et al will not reject the relatively large MTI output signals caused by MTI processing of the smaller amplitude, nonlimited MTI input signals. This is because its design specifically functions to reject only the MTI residue resulting from the MTI input signals that are large enough to have been limited by the receiving system.

U.S. Pat. Nos. 4,459,592, 4,684,950 and 5,485,157 teach ratio comparator methods fifty and means for establishing an adaptive clutter threshold level to reject clutter even though it is strong. Specifically, a ratio comparator technique is taught that functions on the basis of the ratio of the amplitudes of two signals: one proportional to the radar received signal and which contains doppler frequencies at and near zero, and the other which is proportional to the output of the doppler processor. As is explained later in the present disclosure, when pulses are received from directions at or near an antenna pattern minimum, the ratio comparator technique may permit the passage the doppler processor output. Under usual circumstances, i.e., when the received signal strength is not large enough to cause the signal input to the doppler processor to be appreciably amplitude limited, the clutter residue is negligibly small. However, as described above, the clutter residue is of appreciable amplitude when hard limiting exists prior to the doppler processor input. Therefore, the ratio comparator technique will not reject clutter spikes that are created by hard limiting prior to the doppler processor.

SUMMARY OF THE INVENTION

The invention is an improved clutter suppressor for MTI and pulse doppler radars operating so that the received clutter pulses are large enough to cause amplitude limiting of the received signals prior to being input to the doppler processor. It is useful for radars that use antenna beam scanning because the combination of limiting and beam movement across a clutter source can create strong clutter residue at the output of a doppler processor. The invention can be implemented with either analog or digital technology, or with a microprocessor and software.

The objects of the invention are to provide circuits and methods that:

(1) Will reject land and sea clutter signals yet pass moving target signals and will function over a wide range of clutter amplitudes including those that hard limit either or both the receiver and analog-to-digital converter, thereby improving the radar system's sensitivity for detecting moving targets in clutter.

(2) Can be used with a MTI or a pulse doppler radar which uses MTI cancelers that process either unipolar or bipolar video (either single signal or I and Q signals) signals.

(3) Can be used with a MTI or a pulse doppler radar using a plurality of doppler filters.

(4) Can be used with a MTI or a pulse doppler radar which uses a MTI canceler and a plurality of doppler filters.

To accomplish these objects, the invention includes an aggregator means that functions in operative association with a ratio comparator. The ratio comparator, taught in U.S. Pat. Nos. 4,459,592, 4,684,950, and 5,485,157, rejects surface clutter on the basis of the ratio of the magnitudes of two signals that are processed through channels having different doppler frequency transmission characteristics. However, experience shows that the target detection capability of the ratio comparator technique is degraded when it is required to operate under amplitude limiting clutter conditions. The present invention provides an effective way to maintain a sensitive target detection capability, yet reject clutter residue whether or not the received clutter signals are amplitude limited.

The ratio comparator is designed to provide an output signal for a moving target on the basis of the relative magnitude of signals in a target channel and a reference channel. However, the combination of hard limited input clutter and a scanning antenna generates doppler frequency components that can cause the residue of amplitude limited clutter to appear to the ratio comparator as a moving target. The aggregator receives the comparator output signals and distinguishes between moving targets and the residue of surface clutter on the basis of the fraction of received pulses which appear target-like to the ratio comparator. In this manner, the invention can distinguish clutter residue from targets signals even though the receiving system is hard limited by surface clutter.

DESCRIPTION OF THE PREFERRED EMBODIMENTS

Figure 1:
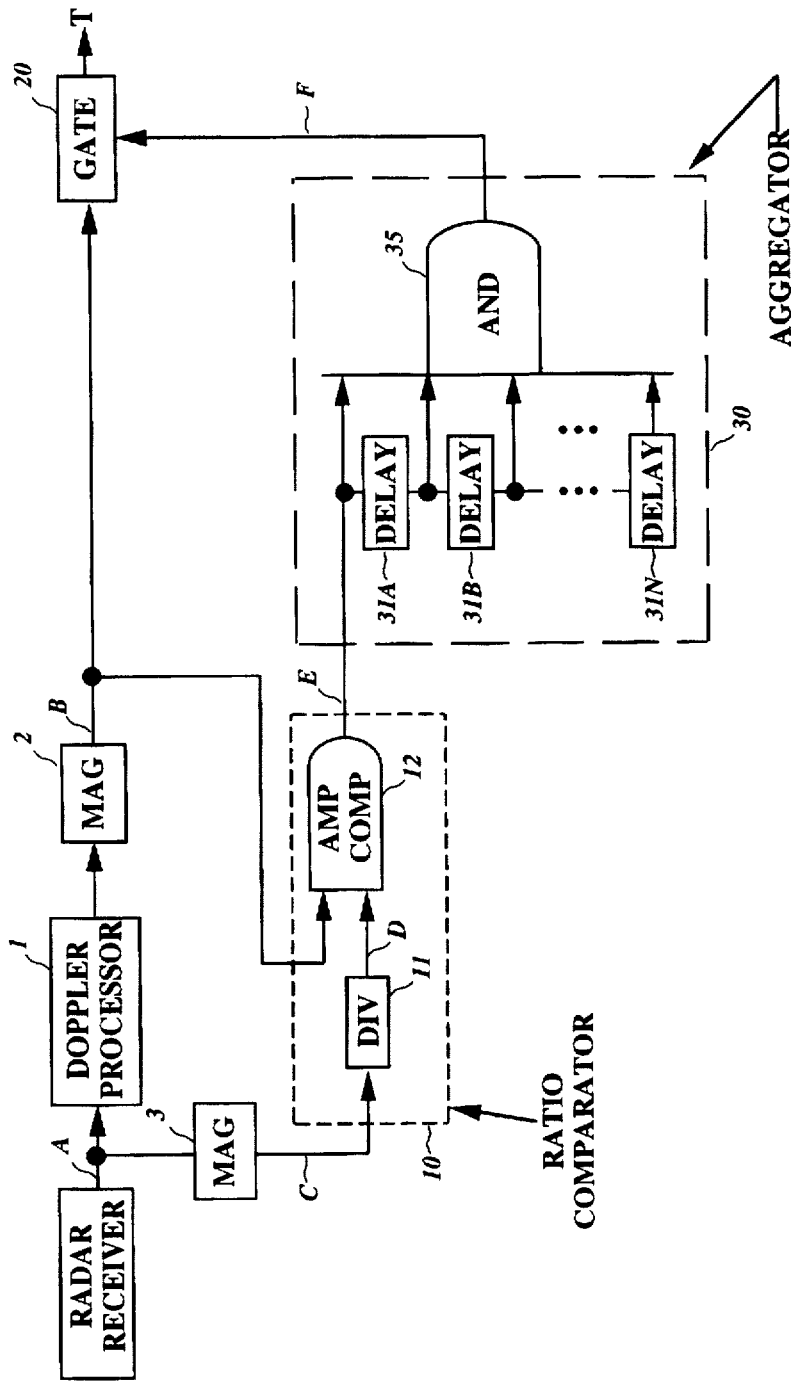
FIG. 1 is a block diagram that illustrates principal features of the radar detection system in accordance with the present invention.
Figure 2:
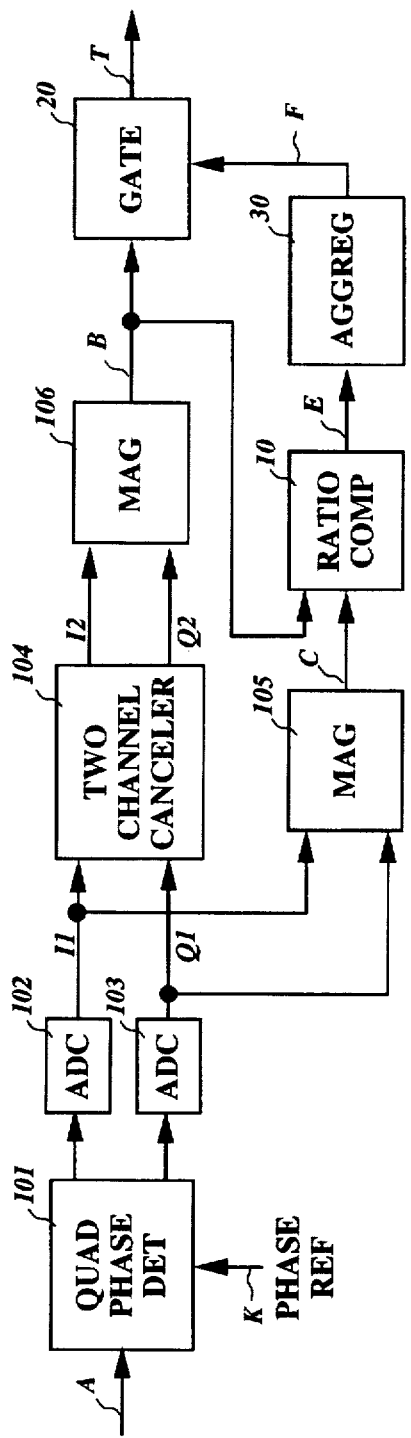
FIG. 2 is a block diagram that illustrates use of the present invention when using I and Q processing and a two channel (I and Q) MTI canceler.
Figure 3:
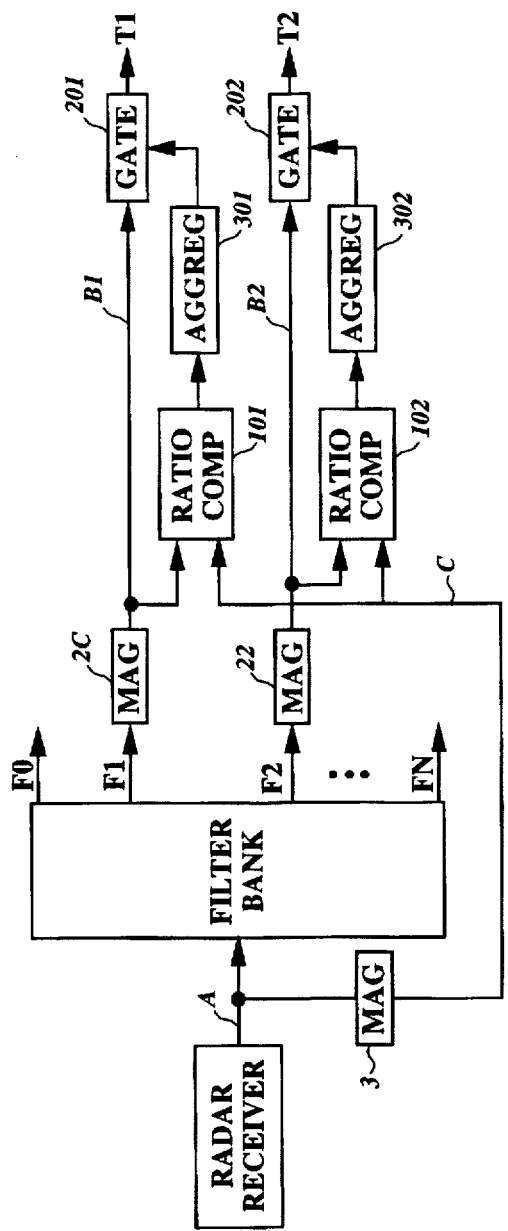
FIG. 3 is a block diagram that illustrates principal features of the present invention when a doppler filter bank is used.
Figure 4:
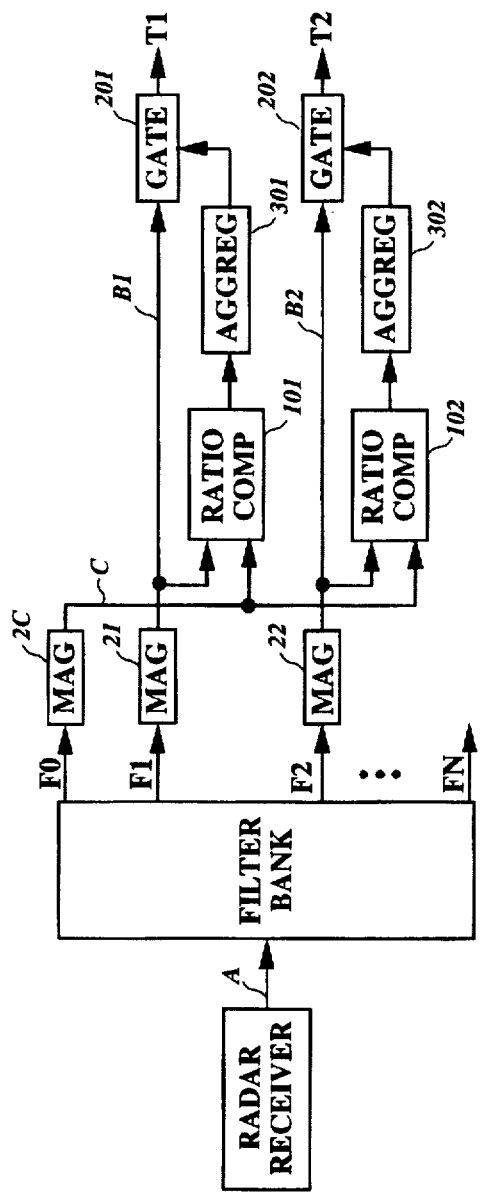
FIG. 4 is an alternate block diagram that illustrates principal features of the present invention when a doppler filter bank is used.

Embodiments of this invention can be implemented with either analog or digital circuitry, or with a computer and software. FIGS. 1, 3 and 4 illustrate the basic features of the invention. To simplify these figures and to thereby highlight key features of the invention, only one channel, i.e., I (in-phase) or Q (quadrature-phase) is shown. Most modern signal processors process the I and Q video separately after digitizing with an analog-to-digital converter, and then appropriately combine the processed digital I and Q signals for obtaining signal magnitude. FIG. 2 shows this when the filtering is done with a two channel (I and Q) MTI canceler. The figure includes a phase detector, block 101, for generating I and Q video signals, and analog-to-digital converters, blocks 102 and 103. Readers familiar with the signal processing art will recognize that neither block 101 is necessary nor are blocks 102 and 103 necessary. In practice, radar doppler processors process either unipolar video or bipolar video signals; wherein the bipolar signals may be either a single signal or both an I and a Q signal. In addition, a doppler processor may comprise only a MTI canceler, a plurality of doppler filters, or a MTI canceler and a plurality of filters. It is to be understood, therefore, that all of the system embodiments of this disclosure can employ digital signal processing and can use I and Q processing.

FIG. 1 illustrates principal features of the invention. A radar receiver provides received signal A which is filtered by doppler processor 1 and processed by magnitude detector 2 to provide doppler filtered unipolar signal B in response to signal A. Signal B along with signal C are input to a ratio comparator, block 10, which provides its output, signal E, as input to the aggregator, block 30. As discussed below, if signal B is due principally to a moving target, aggregator output signal F is non-zero and it activates gate 20 to allow signal B to become output signal T. If signal B is dominated by clutter, signal F is zero and gate 20 is not gated on and thus signal T is gated off for not being a target. From this discussion it is apparent that signal F, per se, can also serve as a clutter suppressed output for detecting targets. The difference being that signal F will be either zero or a fixed amplitude. However, when signal T is non-zero its amplitude equals the amplitude of signal B.

When considering this specification, it is to be recognized that the following is occurring: the receiver is providing signal A which is comprised of radar echo pulses which at each radar range occur at the radar pulse repetition frequency, and signal A changes from pulse-to-pulse because of changes in the antenna pointing direction. Thus, the delay and timing of signals in the different channels should be controlled so that signals when compared are from the same radar range cell and from the same or nearly same antenna pointing direction. For example, in FIG. 1 conventional signal processing practices concerning propagation delays and timing cycles should be exercised for synchronizing signals B and D at amplitude comparator 12 and for signals B and F at gate 20, respectively.

The operation of the ratio comparator, block 10, of FIG. 1 follows the teachings of U.S. Pat. Nos. 459,592, 4,684,950 and 5,485,157. Divider 11 of block 10 is set so that the following is true at each radar range cell: (1) if signal B is due to surface clutter, signal D exceeds signal B and signal E is zero and (2) if signal B is due to a moving target, signal B exceeds signal D and signal E is non-zero. Thus, ideally, signal E is output from the ratio comparator, block 10, only if a moving target is present. However, if clutter is hard limited prior to the doppler processor, signal B will contain large amplitude clutter spikes due to the antenna beam scanning across a source of clutter. Therefore, clutter hard limiting can cause signal E to be non-zero and thus to appear as if due to a moving target. However, as now discussed, the aggregator functions so that signal F if due to surface clutter is zero, but signal F is non-zero if due to a moving target.

As indicated in FIG. 1, signal E is input to the aggregator, block 30. Also, block 30 is comprised of N delays and N+1 inputs to AND gate 35. Each delay is equal to the pulse repetition interval, i.e., the time between successively received pulses at a given radar range. Therefore the aggregator output, signal F, will be non-zero only if none of the N+1 samples input to AND gate 35 is zero. If none is zero, signal F will activate gate 20 for providing signal T as a clutter suppressed target output. On the other hand, if any of the N+1 inputs to AND gate 25 is zero, signal F and signal T will be zero indicating the presence of clutter and not a target. Therefore, the aggregator provides an output signal only if the ratio comparator output signal is non-zero for the time interval corresponding to N+1 pulses.

As already mentioned, experience indicates that strong MTI clutter spikes are created by the combination of amplitude limiting and scanning. The nature of these clutter spikes is described by W. W. Shrader and V. Gregers-Hansen on page 15.43 of Radar Handbook, Second Edition, M. I. Skolnik, (Ed.), McGraw-Hill, 1990. The main effect is generation of strong residue pulses (spikes) in coincidence with the main lobe skirts near the nulls. On the other hand, the clutter residue within most of the main lobe region is strongly attenuated by the MTI canceler. Although not discussed by Shrader and Gregers-Hansen, clutter spikes also occur near the minima in sidelobes. These spikes at the minima can cause clutter residue in the sidelobe regions that is troublesome out for several beamwidths.

For surface clutter and for most antenna pointing directions, signals A and C of FIG. 1 will greatly exceed signal B. This condition does not, however, occur for pulses received in pointing directions near the minima of signals A and C (where the spikes can be very large). Thus, clutter can cause signal E to be non-zero for antenna pointing directions near an antenna pattern minimum. Of great importance, however, is that the condition of consecutively received, non-zero signal E pulses (at a given radar range) occurs only over a relatively narrow angular width (i.e., a relatively few pulses) compared to the center portion of the major antenna lobe over which moving targets are ordinarily detected. This is why the aggregator, block 30, is effective for rejecting clutter spikes.

The presence or absence of a non-zero aggregator output signal thereby indicates, respectively, the presence of a target or clutter. Also, as shown in FIG. 1, the aggregator output signal can be used to activate gate 20 for providing the output signal T, indicating the presence of a moving target.

In a general sense, the aggregator continuously samples comparator output signals and distinguishes between a moving target and surface clutter on the basis of the fraction of the comparator output signals which appear to be caused by a target. Stated differently, the aggregator provides an output only when, at a given radar range, a moving or running average of the ones and zeros out of the ratio comparator exceeds a predetermined level. The m-out-of-n integrator (see, e.g., Skolnik, 1980, p. 388) can serve as an aggregator because it provides an output only if there are at least m pulses available out of a total on n sampled pulses. The aggregator of FIG. 1 is the simplest of m-out-of-n integrators, i.e., one for which m and n are equal.

Aggregators also can be comprised of batch and delay-line types of integrators. The batch integrator is one that may obtain a moving or running average by continuously summing the amplitudes of a given number of successively received pulses. The delay-line integrator recirculates and adds pulses for each radar range and uses positive feedback from one or more loops (Skolnik, 1980, pp.390–391). Stability is maintained because, on circulation, each pulse is attenuated by a factor which is less than unity. An aggregator comprised of a batch or delay-line integrator must include a thresholding and gate means for providing a non-zero aggregator output (e.g., signal F of FIG. 1) only if the integrator output exceeds a predetermined value.

FIG. 2 depicts an example of FIG. 1 when using a two channel (I and Q) MTI canceler to provide filtering in both the I and Q channels. As in FIG. 1, signal A is obtained from the radar receiver output. For generating I and Q video signals, signal A is input to phase detector 101 which uses a signal K as the phase reference. The analog-to-digital converters, blocks 102 and 103, provide the digitized I and Q signals labelled I1 and Q1. Block 104 comprises cancelers for separately filtering I1 and Q1 and thereby provides the doppler filtered I and Q signals labelled I2 and Q2. Then, signals I1, Q1 and signals I2, Q2 are appropriately combined in magnitude detectors 105 and 106, respectively, to provide signals C and B. It is to be noted that signals B, C, E , F and T in FIG. 2 serve the same role as do the similarly labeled signals in FIG. 1. Ratio comparator 10, aggregator 30, and gate 20 of FIG. 2 also function the same as the similarly labeled components in FIG. 1.

Doppler processors are sometimes comprised of a filter bank or banks either with or without a canceler or cancelers. Filtering is usually obtained with digital computations and a Digital Fourier Transform (DFT). For providing a filter bank with many filters, the Fast Fourier Transform (FFT) is used because of its computational efficiency. To suppress clutter, the filter outputs that pass zero and near zero doppler frequencies are not used.

In FIGS. 3 and 4, filter banks with outputs F0 through FN serve as the doppler processor. Alternatively, the doppler processor can include a canceler for processing signal A prior to being input to a filter bank. In these figures, F0 represents a filter that includes zero and near zero doppler frequencies. These figures include clutter spike rejectors at the outputs of two filters. The ratio comparator/aggregator/gate combinations (blocks 101, 301, 201 and 102, 302, 202) of FIGS. 3 and 4 are like blocks 10, 30 and 20 of FIGS. 1 and 2 As illustrated, the output signals after being processed by the spike rejectors are designated T1 and T2. Also for FIGS. 3 and 4, target channel signals B1 and B2 are obtained from filters F1 and F2 via magnitude detectors 21 and 22. Their magnitudes are in response to received signal A, and they are obtained from filters that suppress doppler frequencies at and near zero. Also, the ratio comparator/aggregator/gate combinations (blocks 101/301/201 and 102/302/202) are used to gate, respectively, target channel signals B1 and B2.

In FIG. 3, the reference signal C supplied to the ratio comparators (blocks 101 and 102) is obtained from received signal A via magnitude detector 3. Thus, the reference signal C in FIG. 3 is obtained prior to doppler filtering as it is in FIG. 1. In FIG. 4 the reference signal C is obtained from the output of filter F0 via magnitude detector 2C. Recall that the passband for filter F0 is centered at zero doppler frequency. Therefore, reference signal C of FIG. 4 has magnitude that varies in direct proportion to the magnitude of stationary and slowly moving clutter.

System performance can be improved if the target channel signal is noncoherently integrated, if enough pulses are available while the antenna scans through one beaiiwidth. Provision of an integrated target channel signal as input to the ratio comparator will improve its performance, as discussed in U.S. Pat. Nos. 4,459,592, 4,684,950 and 5,485,157. Obviously integration will also improve the output signal-to-noise ratio.

In designing radar detection systems that employ applicant's invention, the signal processing practice of compensating for relative signal delays usually will be necessary. This is because the invention's purpose is to simultaneously compare signals that originate at the same radar range cell, but that are obtained via components that require different transit times.

The above described embodiments of the doppler detection system may be used in practicing the method of doppler radar detection in accordance with the present invention. The method comprises the steps of providing a received signal with doppler frequency components in response to radar echoes; frequency filtering said received signal and providing at least one filtered signal; providing a target channel signal with magnitude in response to the magnitude of the received signal by frequency filtering to suppress doppler frequencies at and near zero; providing a reference signal having doppler frequencies at and near zero frequency with magnitude in response to the magnitude of the received signal; comparing the target channel signal and the reference signal and providing a ratio comparator output signal of a first level only when the ratio of the target channel signal magnitude to the reference signal magnitude is less than a predetermined value and of a second level whenever this ratio exceeds the predetermined value; and providing an aggregator output signal at a radar range cell by integrating said comparator output signal.

The method of providing doppler radar detection may include using a unipolar video signal, a bipolar video signal, an IF signal or a RF signal as the received signal.

It is understood that the illustrative embodiments discussed above and illustrated in the accompanying drawings have been set out by way of example, not by way of limitation. Numerous other embodiments and variants are possible without departing from the spirit and scope of the invention, its scope being defined by the appended claims.

What is claimed is:

1. A doppler radar system for processing the received signal from a radar receiver to detect moving targets and suppressing clutter, said clutter being radar echo signals from stationary and slowly moving objects having doppler frequencies at and near zero, comprising:

doppler processor means for frequency filtering the received signal to suppress doppler frequencies at and near zero and for providing at least one filtered signal in response to said received signal;

target channel means connected to said doppler processor means for providing a target channel signal with magnitude in response to the magnitude of said received signal;

reference channel means connected to said radar receiver comprising attenuation means for providing a reference signal having doppler frequencies at and near zero with magnitude in response to the magnitude of said received signal;

ratio comparator means for providing a ratio comparator output signal of a first level when the ratio of the target channel signal magnitude to the reference signal magnitude is less than a predetermined value and of a second level when the magnitude of said ratio exceeds the predetermined value, said predetermined value being established by said attenuation means; and aggregator means for providing an aggregator output signal at a radar range cell for distinguishing moving target signals from clutter, said aggregator comprising integrator means for integrating said comparator output signal.

2. A radar detection system according to claim 1, wherein the aggregator means comprises delay means and gate means for providing a non-zero aggregator output signal at a radar range cell only if for N pulse repetition intervals there are at least M comparator output signals of said second level at said range cell, where M is less than or equal to N.

3. A radar detection system according to claim 1, wherein the aggregator means comprises delay-line integrator and gate means.

4. A radar detection system according to claim 1, wherein the aggregator output signal activates a gate which thereby outputs the target channel signal constituting a clutter suppressed output signal.

5. A radar detection system according to claim 1, wherein the aggregator output signal is provided as said clutter suppressed output signal.

6. A radar detection system according to claim 1, wherein the said doppler processor means comprises MTI canceler means.

7. A radar detection system according to claim 1, wherein the said doppler processor means comprises filter bank means.

8. A radar detection system according to claim 1, wherein the said doppler processor means comprises a combination of MTI canceler and filter bank means.

9. A radar detection system according to claim 1, wherein the means for providing said reference signal is comprised of a filter for passing a band of frequencies that includes zero frequency.

10. A radar detection system according to claim 1, wherein the target channel means comprises an integrator means for noncoherently integrating said target channel signal.

11. A method of doppler radar detection of moving targets for providing a clutter suppressed radar output signal, said clutter being radar echo signals from stationary and slowly moving objects having doppler frequencies at and near zero, comprising the steps of:

providing a received signal with doppler frequency components in response to radar echoes;

frequency filtering said received signal and providing at least one filtered signal;

providing a target channel signal with magnitude in response to the magnitude of the received signal by frequency filtering that suppresses doppler frequencies at and near zero;

providing a reference signal having doppler frequencies at and near zero frequency with magnitude in response to the magnitude of the said received signal;

comparing the target channel signal and the reference signal and providing a ratio comparator output signal of a first level only when the ratio of the target channel signal magnitude to the reference signal magnitude is less than a predetermined value and of a second level whenever this ratio exceeds the predetermined value; and providing an aggregator output signal at a radar range cell by integrating said comparator output signal.

12. A method of doppler radar detection of moving targets according to claim 11, wherein a non-zero aggregator output signal is provided only if for N pulse repetition intervals there are at least M comparator output signals of said second level at said range cell, where M is less than or equal to N.

13. A method of doppler radar detection of moving targets for providing a clutter suppressed radar output signal according to claim 11, wherein the aggregator output signal functions as said clutter suppressed output signal.

14. A method of doppler radar detection of moving targets for providing a clutter suppressed radar output signal according to claim 11, wherein the step of providing said clutter suppressed output signal includes outputting the target channel output signal only when said aggregator signal is of said second level.

15. A method of doppler radar detection of moving targets for providing a clutter suppressed radar output signal according to claim 11, wherein said step of providing a reference signal with magnitude in response to said received signal includes frequency filtering for passing a band of frequencies that includes zero frequency.

16. A method of doppler radar detection of moving targets for providing a clutter suppressed radar output signal according to claim 11, wherein the step of providing a target channel signal includes noncoherently integrating said target channel signal.

* * * * *